S. REID.
HOSE-PIPE NOZZLE.

No. 170,397.

Patented Nov. 23, 1875.

Attest:
C. Fritz
N. J. Miller

Inventor:
Samuel Reid
By N. Crawford
Att'y

UNITED STATES PATENT OFFICE.

SAMUEL REID, OF CHICAGO, ILLINOIS.

IMPROVEMENT IN HOSE-PIPE NOZZLES.

Specification forming part of Letters Patent No. 170,397, dated November 23, 1875; application filed April 9, 1875.

*To all whom it may concern:*

Be it known that I, SAMUEL REID, of Chicago, in the county of Cook, in the State of Illinois, have made certain Improvements in Hose-Pipe Nozzles, of which the following is the specification:

The object of this invention is to construct a nozzle to contain a sprinkler and stream eduction-pipe, and have the device operate to use one or the other, or to shut off all the flow of water through either at will, and accomplish such result without any projecting part to interfere with, or catch into, surrounding objects that it may come in contact with in its use; and it consists in the construction of the parts whereby the object is attained, as will be fully hereinafter described.

Figure 1:
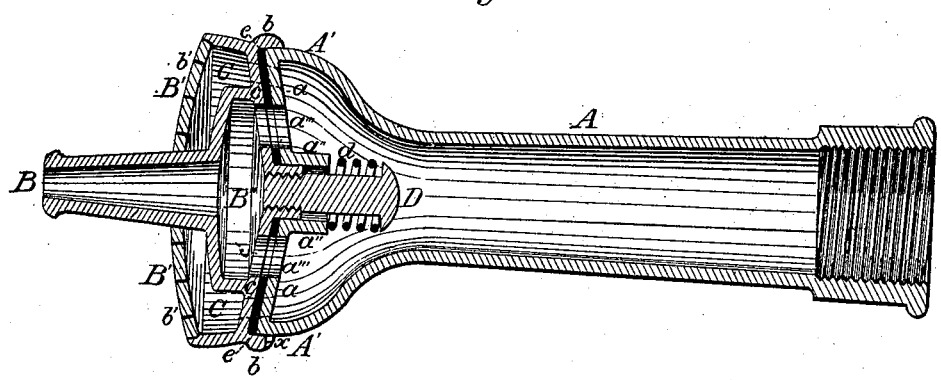
Figure 2:
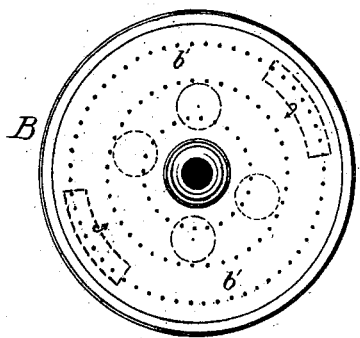
Figure 3:
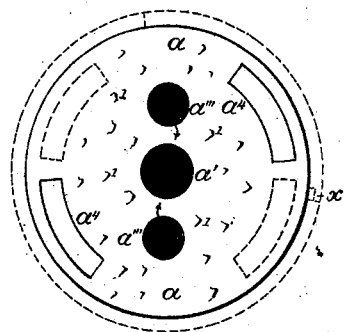
Figure 4:
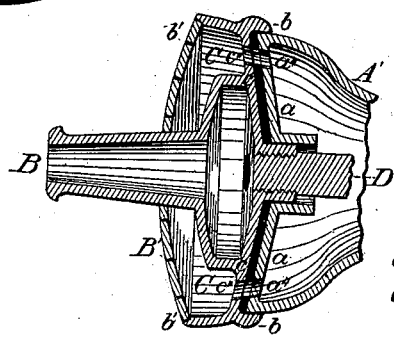

In the drawings, Figure 1 represents a longitudinal section of the nozzle; Fig. 2, the eduction end view of nozzle. Fig. 3 is a view of the outer end of the induction-pipe, with its openings; Fig. 4, detail in section.

A is the induction-pipe, having a screw-thread to attach it to the hose-pipe, an enlarged outer end, A', with an end plate, $a$, that is concave on its outer surface with a center hole, $a'$, with an inwardly-projecting flange, $a''$, around the hole and openings, or ports $a'''$ $a'''$ and $a^4$ $a^4$. B is the stream-nozzle of the usual form, and B' is the convex perforated rose or sprinkler-head formed altogether, and projecting to cover the enlarged end A' of the induction-pipe A, as seen in Fig. 1, and containing chamber or space C around the center of the stream-nozzle B between the outer wall of the sprinkler B' and the wall forming the sides of the nozzle B, and terminating in an inner concave plate, $c$, forming an inclosing-flange, $b$, on its outer circumference to embrace the enlarged part of the pipe A', and secure it in proper position upon pipe A. This concave plate $c$, that forms a part of the head or nozzle, is parallel in position with plate $a$ of pipe A, is perforated with openings the same as plate $a$, and so as to be coincident therewith, when desired. The center opening has an inwardly-projecting flange to fit into the center hole of plate $a$, and has a screw-thread cut therein to receive screw D. $d$ is a spiral spring around the body of screw D, one end bearing on flange $a''$ of plate $a$, and the other on the head of screw D, while the screw goes through plate $a$ and screws into plate $c$, thus holding the two parts together by a flexible or yielding connection, whereby one part may be turned upon the other without separating from such other. $e$ is a plate-packing of soft leather, or rubber, of the same size in diameter as concave-plate $a$, and has the same openings therein—to wit: $a'$, $a'''$, and $a^4$, and to be coincident therewith, and secures a water-tight joint between plates $a$ and $c$, and flange $b$. Concave plate $a$ on its outer surface has sharp projections 1 or rasp-cut teeth, so that, as the head B B' is screwed fast to A, the teeth will take into the packing $e$ and prevent it from turning whenever the head B' is turned for any purpose. $x$ is a projecting stud inserted in and near the outer end of pipe A, and within the overlap of flange $b$ on head B B', which, for one-third, more or less, of its circumference is cut away, so that the head may be partially revolved on the pipe A and be stopped in its partial revolution by the termination of the removal of flange $b$, as a shoulder is formed at that point against which the stud strikes whenever the head is turned to bring them in contact.

By this construction the head B B' can be turned upon pipe A, and in doing so the openings $a'''$ in concave plate $a$ will be coincident with openings $c'$ in plate $c$, and the water, passing through pipe A and the openings $a'''$ and $c'$, will pass into chamber B'' and out through the stream-nozzle B in a continuous stream; but, if the head is revolved still farther so that the lug $x$ strikes the opposite shoulder or stop on flange $b$, openings $a'''$ and $c'$ will not be coincident, hence the flow of water will not pass through them; but openings $a^4$ in concave plate $a$ and openings $c''$ in plate $c$ will be coincident, and the water will pass from pipe A through said openings into chamber C and out through fine holes $b'$ of the sprinkler-head B' as spray, or, if the head B B' is revolved so as to leave the lug $x$ midway between the shoulders or stops on the flange $b$, it will cut off all flow of water through either the stream-nozzle or through the sprinkler or spray rose, consequently a stream and spray nozzle and head is obtained in the same device.

I am aware that the two purposes, to wit, the stream and spray nozzle have been before united in the same head, but in a different way from my construction, as in the construction above described the head is without projecting stop or turn-cocks, or other means that project for interrupting or changing the flow of water from one purpose to the other.

Having thus described my invention, what I claim, and desire to secure by Letters Patent, is—

The revolving head B B', having chamber C B'' and concave plate $c$, provided with ports $c'$ $c''$ and central flanged opening, in combination with the pipe A, having the enlarged part A' and plate $a$, provided with ports $a'''$ $a^4$, and central flanged opening $a''$, the head and pipe secured together by screw-bolt D and spring $d$, substantially as described.

SAMUEL REID.

Witnesses:
 WHEELER D. STURTEVANT,
 GEO. L. COOK.